(12) United States Patent
Sudo et al.

(10) Patent No.: US 10,235,856 B2
(45) Date of Patent: Mar. 19, 2019

(54) ELECTRONIC APPARATUS AND METHOD

(71) Applicant: KABUSHIKI KAISHA TOSHIBA, Minato-ku, Tokyo (JP)

(72) Inventors: Takashi Sudo, Fuchu Tokyo (JP); Akira Tanaka, Mitaka Tokyo (JP); Kenichi Doniwa, Asaka Saitama (JP); Hiroaki Komaki, Tachikawa Tokyo (JP); Hiroki Kumagai, Kunitachi Tokyo (JP); Yasuhiro Kanishima, Tokyo (JP); Nobuhide Okabayashi, Tachikawa Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 108 days.

(21) Appl. No.: 14/968,759

(22) Filed: Dec. 14, 2015

(65) Prior Publication Data
US 2017/0061758 A1 Mar. 2, 2017

(30) Foreign Application Priority Data

Sep. 1, 2015 (JP) ................................. 2015-171932

(51) Int. Cl.
*G08B 19/00* (2006.01)
*F16P 3/14* (2006.01)
(Continued)

(52) U.S. Cl.
CPC ............ *G08B 19/00* (2013.01); *F16M 13/04* (2013.01); *F16P 3/14* (2013.01); *G02B 27/017* (2013.01);
(Continued)

(58) Field of Classification Search
CPC .... G08B 19/00; G08B 21/02; G02B 27/0172; G02B 2027/0141; G02B 2027/0178;
(Continued)

(56) References Cited

U.S. PATENT DOCUMENTS 8,264,422 B1 * 9/2012 Persson ................ G06Q 10/087
345/7
9,773,391 B1 * 9/2017 Foshee ................... G08B 21/02
(Continued)

FOREIGN PATENT DOCUMENTS

JP 05-211650 8/1993
JP 10-147411 6/1998
(Continued)

*Primary Examiner* — Kerri L McNally
*Assistant Examiner* — Thang D Tran
(74) *Attorney, Agent, or Firm* — Rutan & Tucker, LLP

(57) ABSTRACT

According to one embodiment, a method executed by an electronic apparatus including storage configured to store device information including first position information indicating a position of a device installed in a particular range and risk information associated with use of the device is provided. The method includes receiving second position information indicating a position of a user wearing an eyeglasses-type wearable terminal and working within the particular range, from the eyeglasses-type wearable terminal and estimating a status of the user, based at least in part on the first position information and the risk information included in the device information, and the second position information.

17 Claims, 13 Drawing Sheets

(51) Int. Cl.
  *G06Q 10/00*     (2012.01)
  *G08B 21/02*     (2006.01)
  *G02B 27/01*     (2006.01)
  *F16M 13/04*     (2006.01)

(52) U.S. Cl.
  CPC ............. *G06Q 10/00* (2013.01); *G08B 21/02* (2013.01); *G02B 2027/014* (2013.01); *G02B 2027/0138* (2013.01); *G02B 2027/0178* (2013.01); *G02B 2027/0187* (2013.01)

(58) Field of Classification Search
  CPC ......... G02B 27/017; G02B 2027/0138; G02B 2027/014; G02B 2027/0187; G16P 3/14; G06Q 10/00
  USPC ....................................................... 340/522
  See application file for complete search history.

(56) References Cited

U.S. PATENT DOCUMENTS

| | | | | |
|---|---|---|---|---|
| 2011/0169917 | A1* | 7/2011 | Stephen | H04N 13/204 348/46 |
| 2012/0123806 | A1* | 5/2012 | Schumann, Jr. | G08G 1/096775 705/4 |
| 2012/0320088 | A1* | 12/2012 | Ihara | G05B 23/0216 345/629 |
| 2013/0006718 | A1* | 1/2013 | Nielsen | G06Q 10/06312 705/7.42 |
| 2013/0009993 | A1* | 1/2013 | Horseman | G06F 19/3418 345/633 |
| 2013/0127980 | A1* | 5/2013 | Haddick | G06F 3/013 348/14.08 |
| 2013/0335301 | A1* | 12/2013 | Wong | G02B 27/0093 345/8 |
| 2014/0145079 | A1* | 5/2014 | Omino | G01T 1/02 250/336.1 |
| 2014/0146075 | A1* | 5/2014 | Takasu | G02B 27/017 345/619 |
| 2014/0168266 | A1 | 6/2014 | Kimura | |
| 2014/0240484 | A1* | 8/2014 | Kodama | G02B 27/017 348/86 |
| 2014/0351191 | A1* | 11/2014 | Kon | G06N 5/04 706/45 |
| 2014/0354784 | A1* | 12/2014 | Park | G01B 11/24 348/50 |
| 2015/0006240 | A1 | 1/2015 | Kanamaru et al. | |
| 2015/0236515 | A1* | 8/2015 | Yoshida | H02J 5/005 307/104 |
| 2015/0309316 | A1* | 10/2015 | Osterhout | G06F 1/163 345/8 |
| 2015/0312559 | A1* | 10/2015 | Ueno | H04N 13/0014 348/53 |
| 2015/0318015 | A1* | 11/2015 | Bose | H04N 7/188 386/248 |
| 2015/0339453 | A1* | 11/2015 | Richards | G06T 11/00 345/633 |
| 2016/0005229 | A1* | 1/2016 | Lee | G06F 3/0488 345/419 |
| 2016/0027217 | A1* | 1/2016 | da Veiga | G06F 3/011 345/8 |
| 2016/0034042 | A1* | 2/2016 | Joo | G02B 27/0172 345/633 |
| 2016/0071320 | A1* | 3/2016 | Smith | G06T 19/006 345/633 |
| 2016/0154240 | A1* | 6/2016 | Lee | G02B 27/0093 345/8 |
| 2016/0217614 | A1* | 7/2016 | Kraver | G06T 19/006 |
| 2016/0229063 | A1* | 8/2016 | Ishiguro | B25J 13/087 |

FOREIGN PATENT DOCUMENTS

| | | |
|---|---|---|
| JP | 2000-354943 | 12/2000 |
| JP | 2002-288294 | 10/2002 |
| JP | 2003-196681 | 7/2003 |
| JP | 2003-216687 | 7/2003 |
| JP | 2004-102727 | 4/2004 |
| JP | 2004-280262 A | 10/2004 |
| JP | 2009-212752 A | 9/2009 |
| JP | 2009-279193 | 12/2009 |
| JP | 2010-271928 | 12/2010 |
| JP | 2011-081737 | 4/2011 |
| JP | 2011-118683 | 6/2011 |
| JP | 2012-212991 | 11/2012 |
| JP | 2013-020422 | 1/2013 |
| JP | 2014-16801 A | 1/2014 |
| JP | 2014-120786 A | 6/2014 |
| JP | 2014-164482 | 9/2014 |
| JP | 2014-228725 | 12/2014 |
| JP | 2015-075832 | 4/2015 |
| JP | 2015-088175 | 5/2015 |
| WO | 2013/105264 A1 | 7/2013 |

* cited by examiner

| Worker ID | Position information | Status |
|---|---|---|
| HO_0001 | Xu1,Yu1 | Working | ~441
| HO_0002 | Xu2,Yu2 | Moving | ~442
| HO_0003 | Xu3,Yu3 | Waiting | ~443
| ... | ... | ... |

F I G. 8

| Device ID | Position information | Device risk |
|---|---|---|
| M_0001 | Xd1,Yd1 | 5 | ~451
| M_0002 | Xd2,Yd2 | 4 | ~452
| M_0003 | Xd3,Yd3 | 1 | ~453
| ... | ... | ... |

F I G. 9

46

| Device ID | Manufacture start time | Work name | Status |
|---|---|---|---|
| M_0001 | 10:00 | Work A | Manufacturing | ~461
| M_0002 | 10:30 | Work B | Preparation complete | ~462
| M_0003 | 11:30 | Work C | Preparation incomplete | ~463
| M_0004 | 12:30 | Work D | Preparation incomplete | ~464
| ... | ... | ... | ... |

F I G. 10

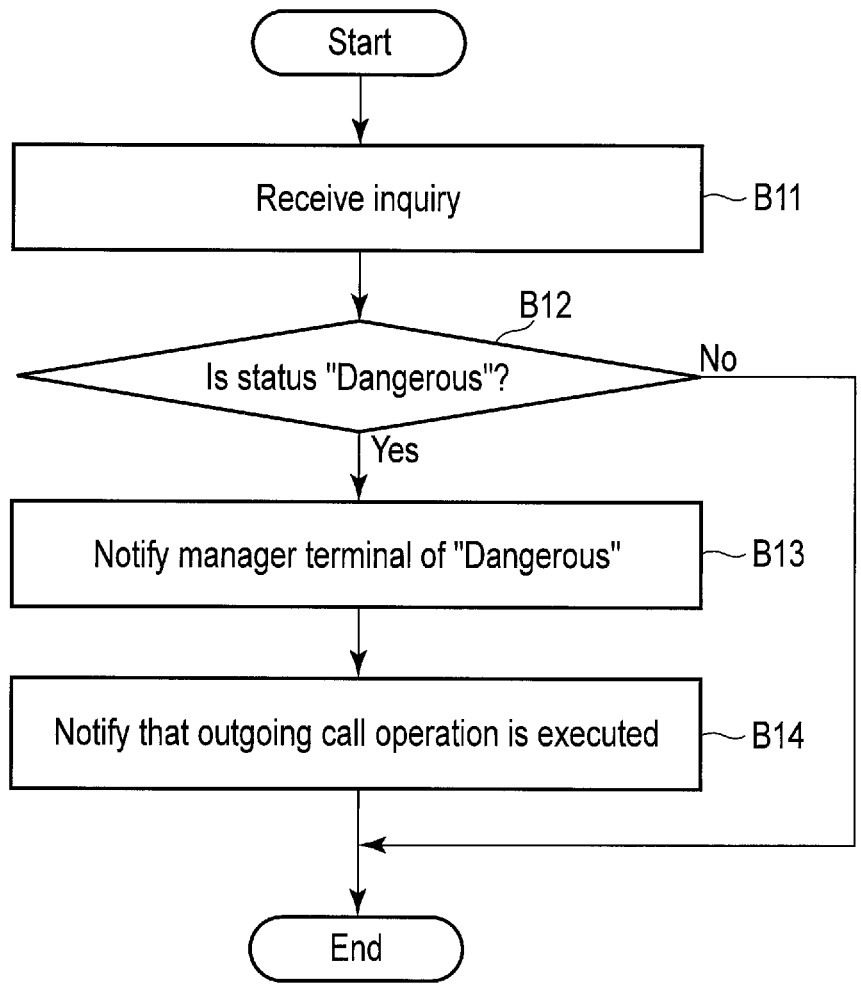
F I G. 14

| Device ID | Position information | Device risk | Work name | Work risk |
|---|---|---|---|---|
| M_0001 | Xd1,Yd1 | 5 | Work A1 | 1 |
|  |  |  | Work A2 | 3 |
|  |  |  | Work A3 | 5 |
| M_0002 | Xd2,Yd2 | 4 | Work B1 | 2 |
|  |  |  | Work B2 | 4 |
| M_0003 | Xd3,Yd3 | 1 | Work C1 | 1 |
| ... | ... | ... | ... | ... |

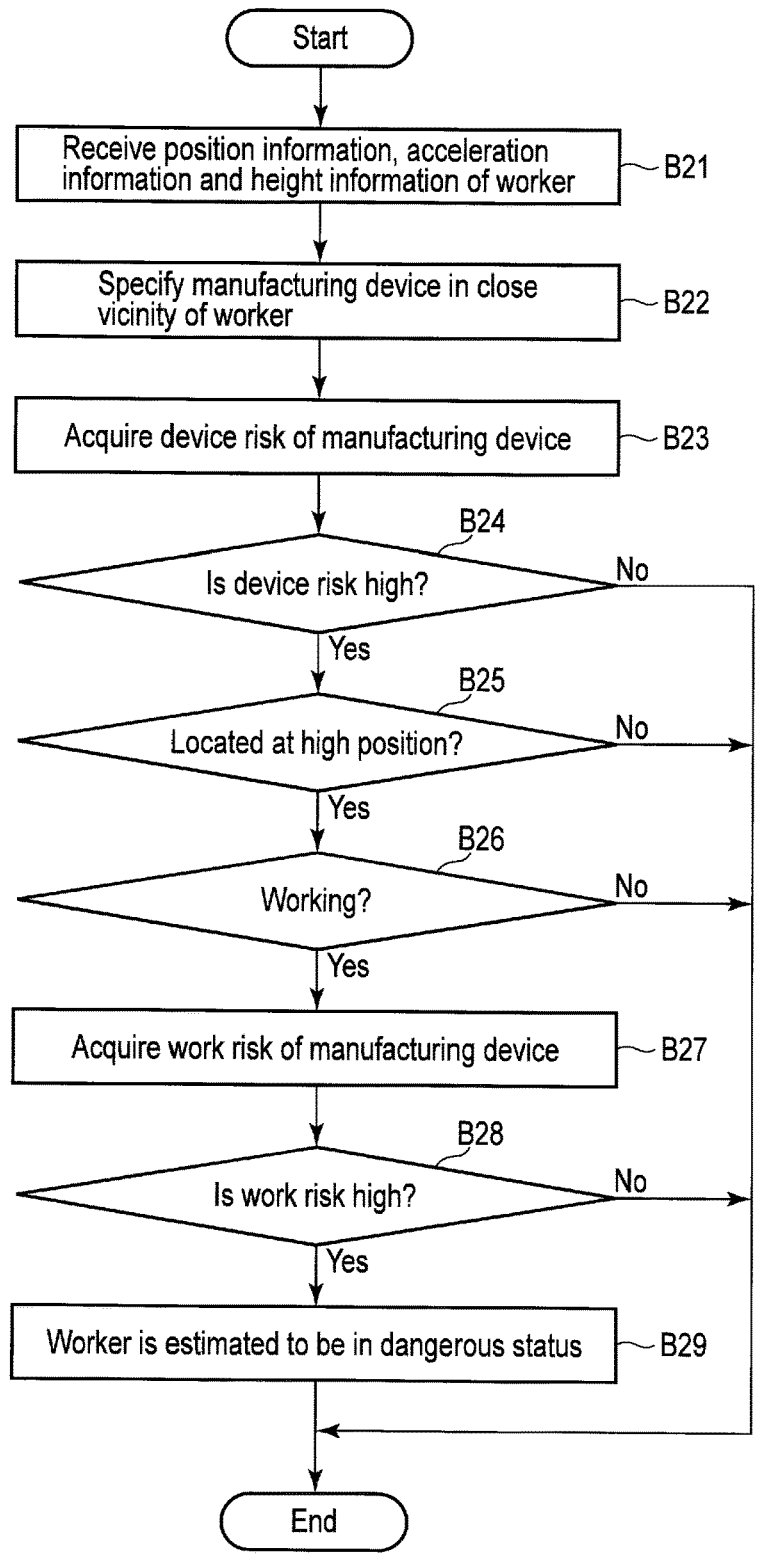
F I G. 17

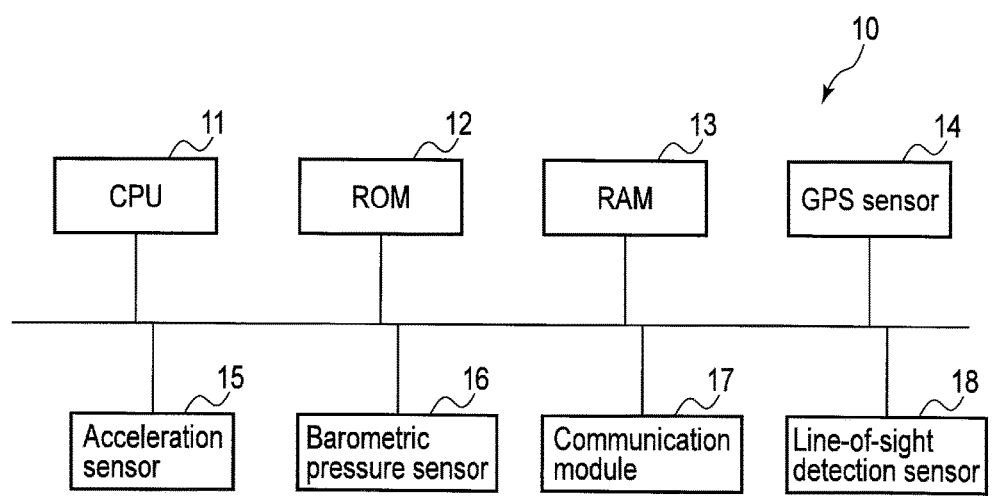
F I G. 18

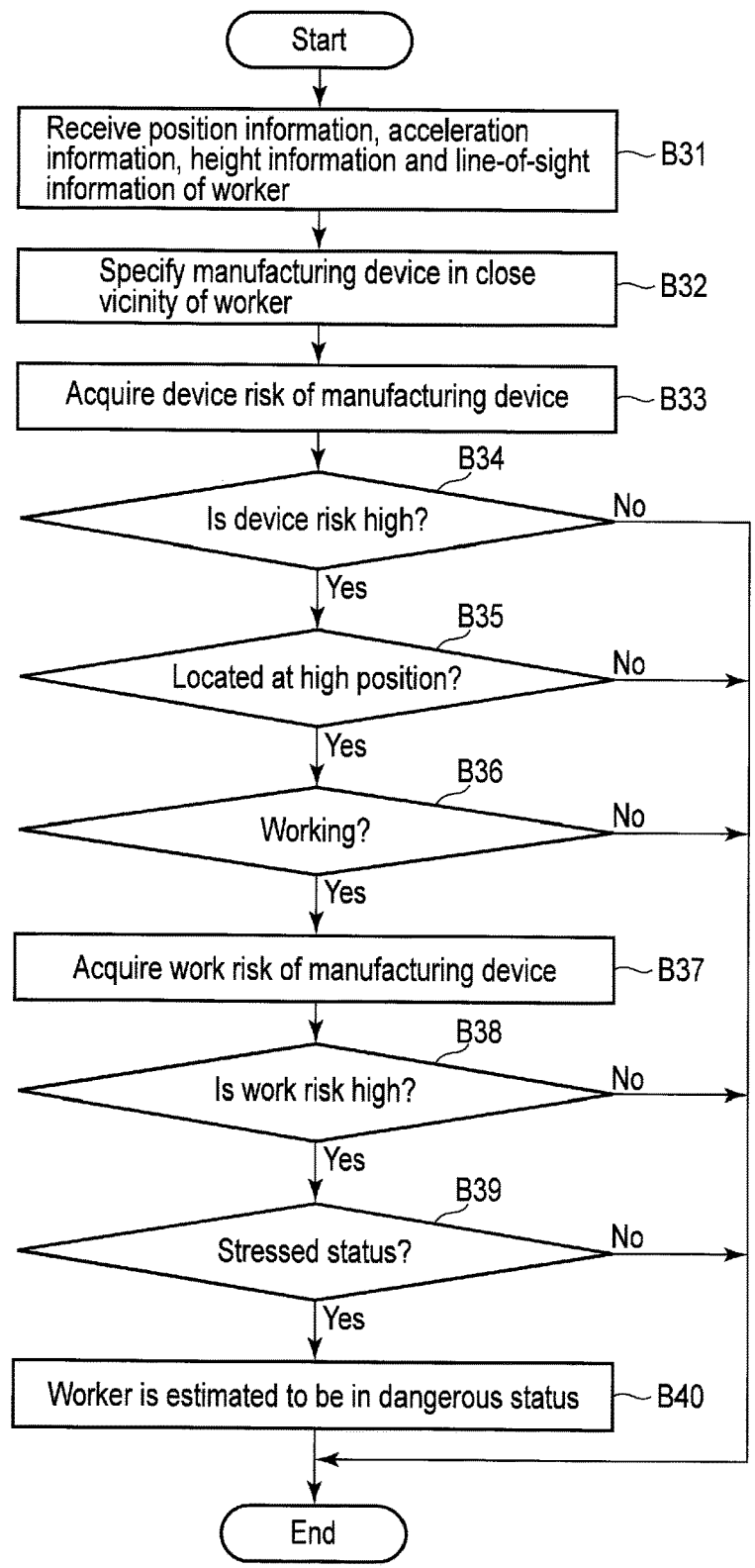
F I G. 19

ELECTRONIC APPARATUS AND METHOD

CROSS-REFERENCE TO RELATED APPLICATIONS

This application is based upon and claims the benefit of priority from Japanese Patent Application No. 2015-171932, filed Sep. 1, 2015, the entire contents of which are incorporated herein by reference.

FIELD

Embodiments described herein relate generally to an electronic apparatus and a method.

BACKGROUND

Recently, for example, a wearable terminal worn and used by a user has been put into practice. As the wearable terminal, for example, an eyeglasses-type wearable terminal, a wristband-type wearable terminal, etc. are known.

Since this wearable terminal can be used in a hands-free state, for example, attachment of a user (hereinafter called a worker) working within a particular range such as a factory has been reviewed.

Incidentally, a manager who manages workers is positioned in the factory where the workers work. The manager gives workers instructions for assignment of works, confirmation and change of works, etc., but, for example, if the factory area is large and the number of workers is great, the instructions are often given by call (speech communication).

For example, however, if a worker in a dangerous status (for example, working at a high position) receives a call (incoming call) from the manager, the worker willing to respond to the call may often lose balance unintentionally and may be involved in an unexpected accident. Furthermore, in such a case, the worker frequently cannot respond to the call from the manager, and this is considered inefficient. A system of recognizing the worker's status is therefore desired.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 8 is a table showing an example of a data structure of worker information stored in worker information storage.

FIG. 9 is a table showing an example of a data structure of device information stored in device information storage.

FIG. 10 is a table showing an example of a data structure of process information stored in process information storage.

FIG. 14 is a flowchart showing a processing procedure of a management server outputting a notification to the worker terminal and the manager terminal.

FIG. 17 is a flowchart showing a processing procedure of status estimation processing.

FIG. 18 is a diagram showing an example of a system configuration of a worker terminal of a third embodiment.

FIG. 19 is a flowchart showing a processing procedure of status estimation processing.

DETAILED DESCRIPTION

Various embodiments will be described hereinafter with reference to the accompanying drawings.

In general, according to one embodiment, a method executed by an electronic apparatus including storage configured to store device information including first position information indicating a position of a device installed in a particular range and risk information associated with use of the device is provided. The method includes receiving second position information indicating a position of a user wearing an eyeglasses-type wearable terminal and working within the particular range, from the eyeglasses-type wearable terminal and estimating a status of the user, based at least in part on the first position information and the risk information included in the device information, and the second position information.

First Embodiment

Figure 1:
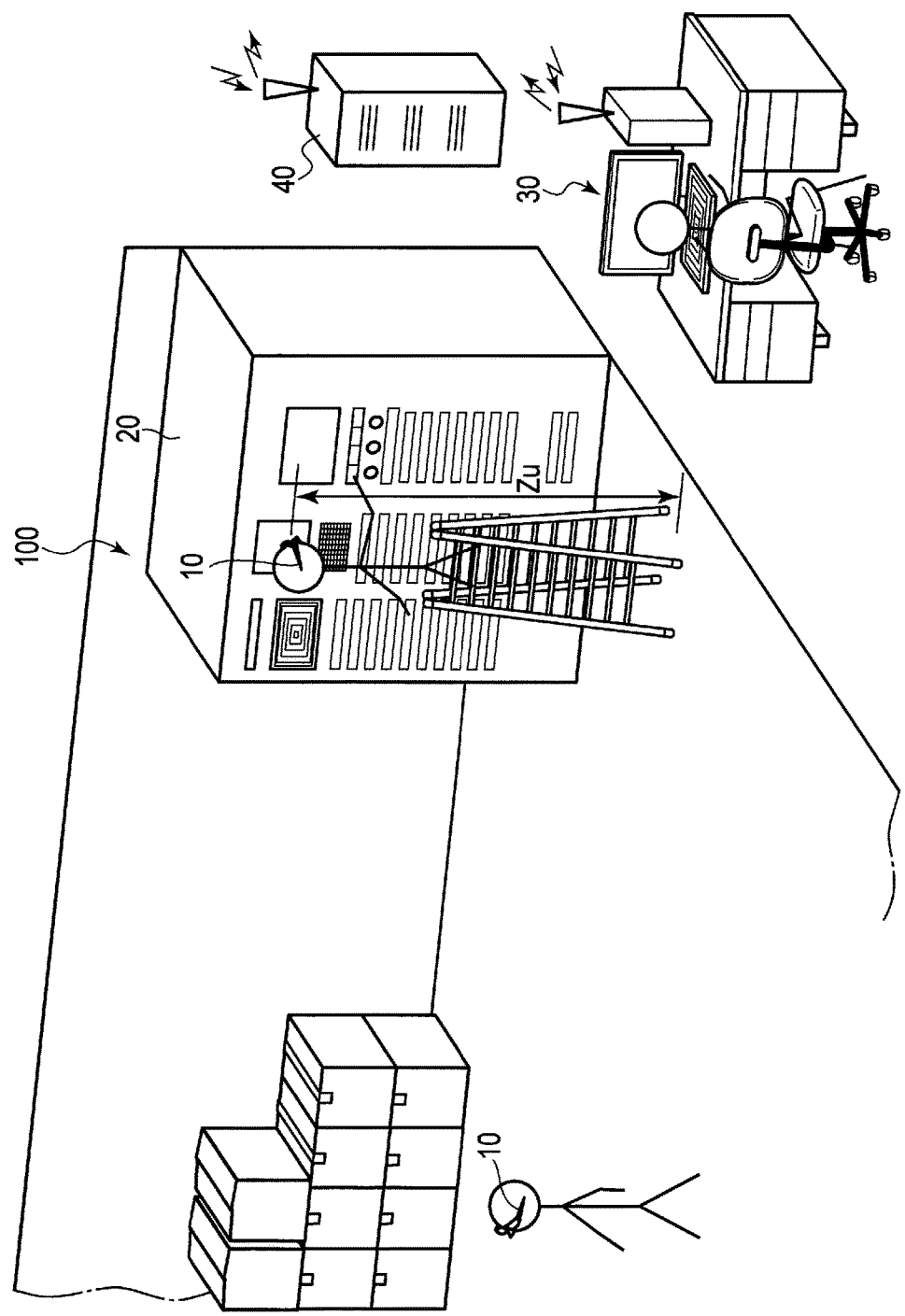
FIG. 1 is an illustration for explanation of an example of an environment using a management system of a first embodiment.

A first embodiment will be described. FIG. 1 is an illustration for explanation of an example of an environment in which a management system including a management server of the present embodiment is used.

The management system of the embodiment is used to manage, for example, a worker working within a particular range (for example, a factory site) and a device (for example, a manufacturing device for manufacturing a product) installed in the range.

As shown in FIG. 1, the management system includes a worker terminal 10, a manufacturing device 20, a manager terminal 30 and a management server 40.

The worker terminal 10 is, for example, a terminal device (user terminal) used by a worker (user) working within a work area 100 such as a factory site. The worker terminal 10 implies, for example, an eyeglasses-type wearable terminal which the worker can wear and use. The worker terminal 10 is hereinafter explained as an eyeglasses-type wearable terminal.

As shown in FIG. 1, a worker wears and uses one worker terminal 10. For this reason, the management system includes the number of worker terminals 10 corresponding to the number of workers.

The manufacturing device 20 is, for example, a device capable of manufacturing a product by a worker operation. The manufacturing device 20 is assumed to be, for example, a device which automatically manufactures a product by allowing the worker to set members necessary for the manufacturing and complete the preparation. In the present embodiment, the management system includes the manufacturing device 20, but may include, for example, any other devices installed in the work area 100.

One manufacturing device 20 is shown in FIG. 1 for convenience, but a plurality of manufacturing devices 20 are assumed to be installed in the work area 100.

The manager terminal 30 is a terminal device used by a manager who manages the worker and the manufacturing device 20 in the work area 100. The manager terminal 30 implies, for example, a personal computer, etc., installed in a monitoring chamber, etc., outside the work area 100. For example, if the manager walks around in the work area 100 to monitor the worker's working condition, the operation condition f the manufacturing device 20, etc., the eyeglasses-type wearable terminal similar to the worker terminal 10 may be used as the manager terminal 30.

The management server 40 is a server device (electronic apparatus) which manages a product manufacturing process executed by the manufacturing device 20 installed in the work area 100. The management server 40 has a function of estimating the status of the worker working within the work area 100, and details of the function will be explained later.

A plurality of access points are assumed to be provided in the work area 100 to allow the worker terminal 10 to execute wireless communication, but are not shown in FIG. 1.

Figure 2:
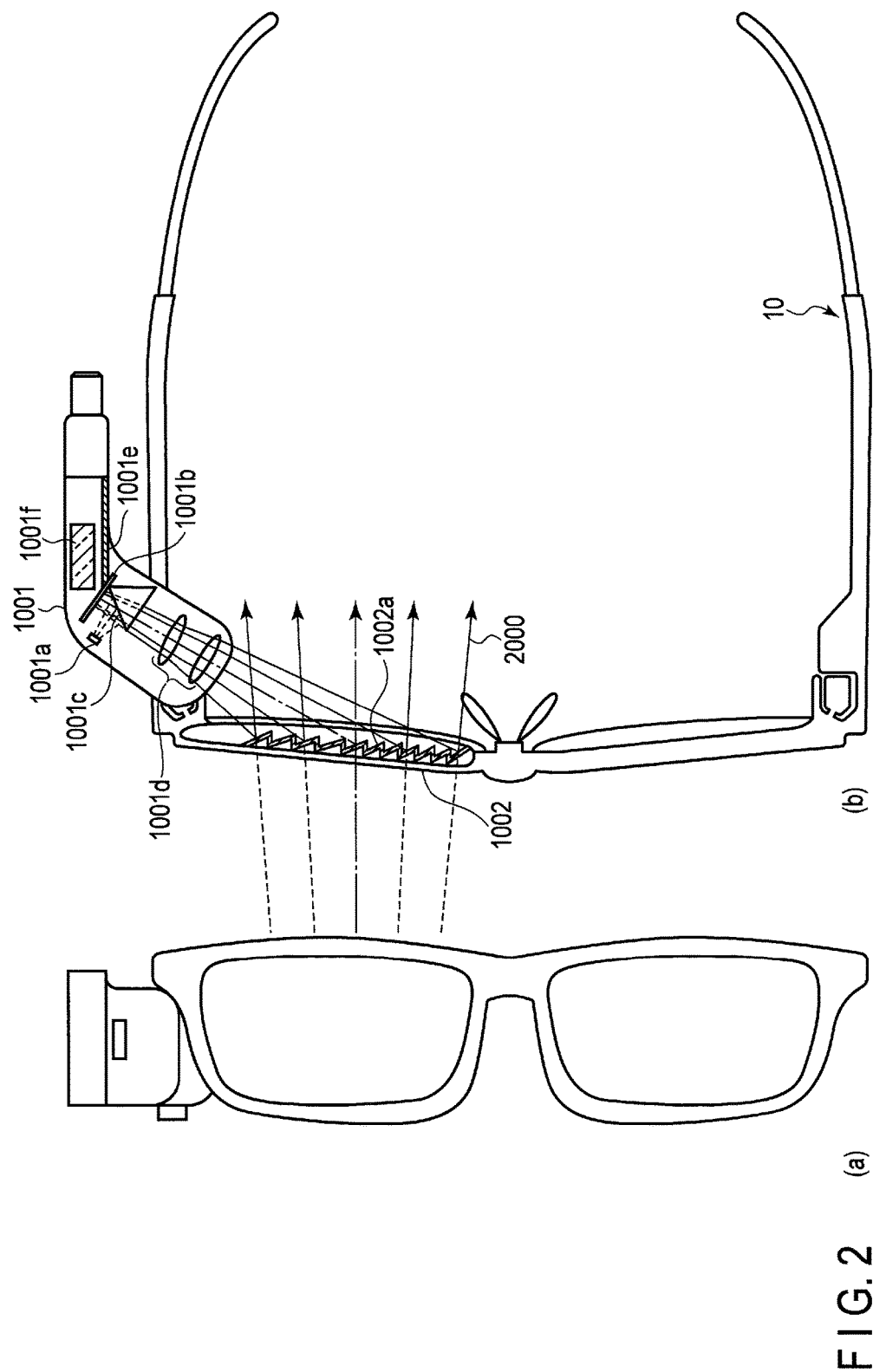
FIG. 2 is a schematic illustration showing an example of a worker terminal worn and used by a worker.
Figure 3:
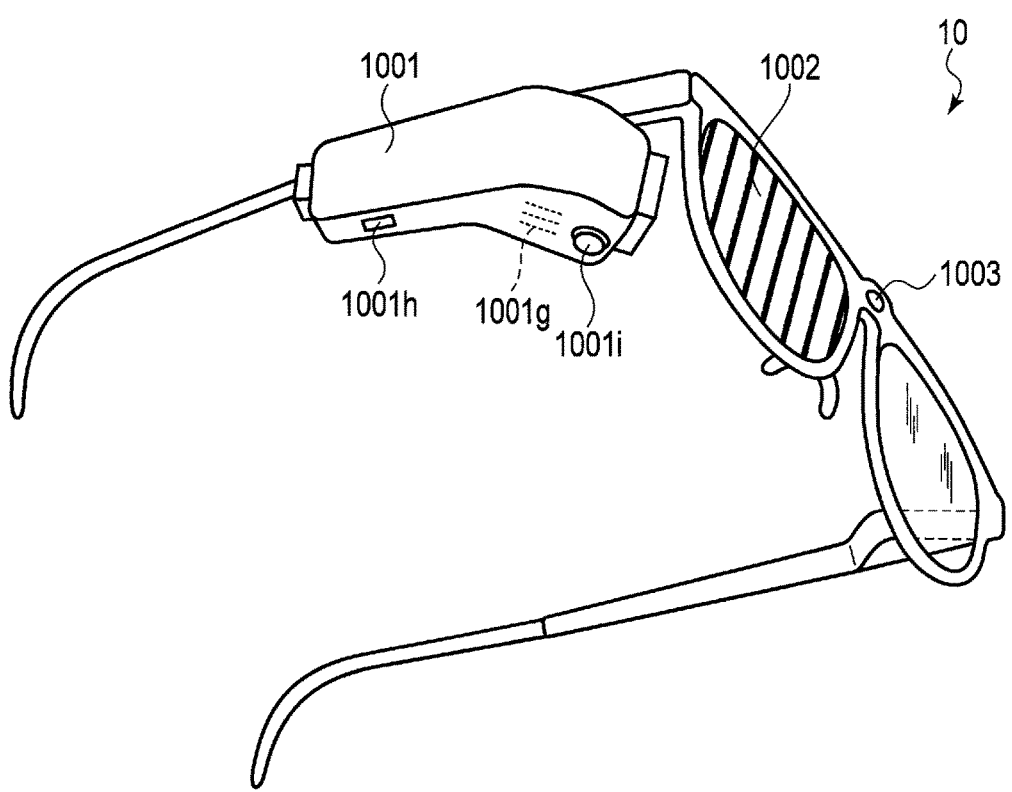
FIG. 3 is a schematic illustration showing an example of the worker terminal worn and used by a worker.

Each of FIG. 2 and FIG. 3 is a schematic illustration showing an example of the worker terminal (eyeglasses-type wearable terminal) worn and used by the worker.

The worker terminal 10 comprises a light projection unit 1001, a lens-integrated screen (display) 1002, etc.

The light projection unit 1001 includes a light source module 1001a, an additional image display module 1001b, a half-mirror module 1001c, a lens group 1001d, a driver 1001e, a built-in power supply 1001f, etc. In the light projection unit 1001, an image and information displayed by the additional image display module 1001b are illuminated with light 2000 emitted from the light source module 1001a, and its reflected light (projected image) is output (emitted). The light 2000 emitted from the light source module 1001a is non-parallel light having divergence (divergent light).

The light source module 1001a should preferably be a dimming-type white LED light source including a plurality of, for example, three light emitting diodes (LED) in which their output light quantities can be varied independently. In this case, three LEDs are assumed to be different in light color. If such a dimming-type white LED light source is used, a display color which can easily be seen to the worker can be provided (output) by changing the light color in accordance with the environment of use that the worker terminal 10 is used in a clean room in which illumination mainly based on, for example, an orange color is often used.

The additional image display module 1001b is, for example, a reflection-type liquid crystal display (LCD) module and displays a predetermined additional image. The predetermined additional image includes, for example, various messages, marks, etc.

The light 2000 emitted from the light source module 1001a is reflected on the half-mirror module 1001c to illuminate the additional image displayed on the additional image display module 1001b, and is reflected again as image light corresponding to the additional image.

The light (additional image light) 2000 reflected at the additional image display module 1001b passes through the half-mirror module 1001c, is given a predetermined image size by the lens group 1001d, and reaches the lens-integrated screen 1002.

The driver 1001e controls the light emitted from the light source module 1001a in response to the additional image displayed on the additional image display module 1001b.

The built-in power supply 1001f is implemented by, for example, a button battery or the like. The worker terminal 10 operates with the power supplied from the built-in power supply 1001f.

The lens-integrated screen 1002 includes a Fresnel lens type half-mirror portion 1002a.

The light 2000 reaching the lens-integrated screen 1002 as explained above is reflected in part on the Fresnel lens type half-mirror portion 1002a to form a virtual image corresponding to the additional image displayed on the additional image display module 1001b.

As shown in FIG. 3, the worker terminal 10 includes a speaker 1001g, a (slide) switch 1001h, a (rotary) knob 1001i, etc., at a predetermined position (for example, a bottom surface portion) of the light projection unit 1001. The switch 1001h is provided to adjust, for example, luminance of the light 2000 emitted from the light projection unit 1001. The knob 1001i is provided to adjust, for example, an angle of projection of the light 2000 emitted from the light projection unit 1001. By operating each of the switch 1001h and the knob 1001i, the worker (user of the eyeglasses-type wearable terminal) can adjust the luminance and the angle of projection while visually recognizing the additional image projected by the lens-integrated screen 1002. In other words, display luminance and color tone of the additional image suitable for the worker's taste can be provided by providing the switch 1001h. In addition, the additional image can be displayed at an optimum position in accordance with the shape and size of the head of the worker, by providing the knob 1001i.

Furthermore, a camera 1003 for taking an image of, for example, a periphery of the worker terminal 10 is provided on the worker terminal 10. The camera 1003, which is provided at, for example, a position shown in FIG. 3, takes an image in a direction of the line of sight of the worker wearing the worker terminal 10.

Figure 4:
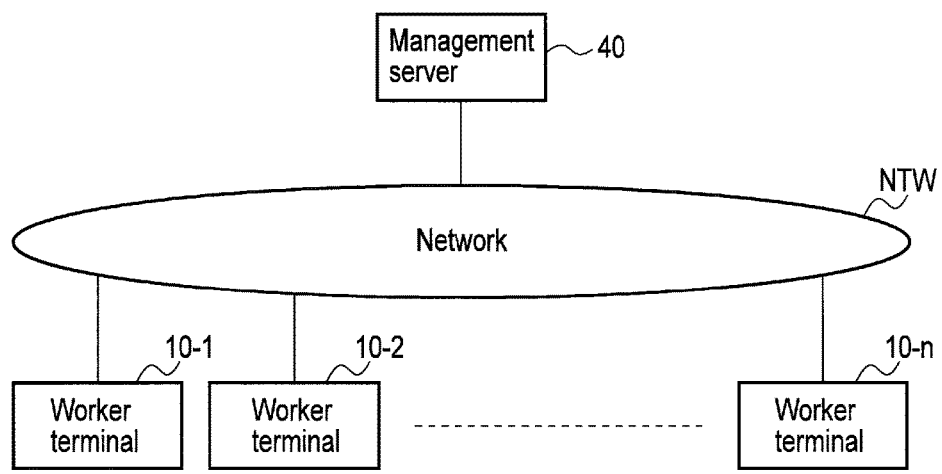
FIG. 4 is a diagram showing an example of a network configuration of a management system.

FIG. 4 shows a network configuration of the management system. An example in which the management system includes a plurality of worker terminals 10 is illustrated in FIG. 4. In FIG. 4, the plurality of worker terminals 10 include worker terminals 10-1, 10-2, . . . , 10-n (where n is an integer greater than or equal to, for example, three).

As shown in FIG. 4, the plurality of worker terminals 10 are connected to the management server 40 via a network NTW so as to enable communication, in the management system of the present embodiment. The management server 40 can thereby receive (acquire) various types of information to be explained later from the plurality of worker terminals 10.

The management server 40 and each of the manufacturing devices 20 may be connected via the network NTW so as to enable communication, but the connection is not shown in FIG. 4. In such a configuration, the management server 40 can receive (collect) information indicating each status of the manufacturing device 20 (hereinafter called status information of the manufacturing device 20) from the manufacturing device 20. Statuses indicated by the status information include, for example, a status in which a product is being manufactured, a status in which preparation for manufacturing the product is completed, a status in which the preparation for manufacturing the product is not completed, etc. The status information may include information as to whether the manufacturing device 20 is operated or not, etc.

Figure 5:
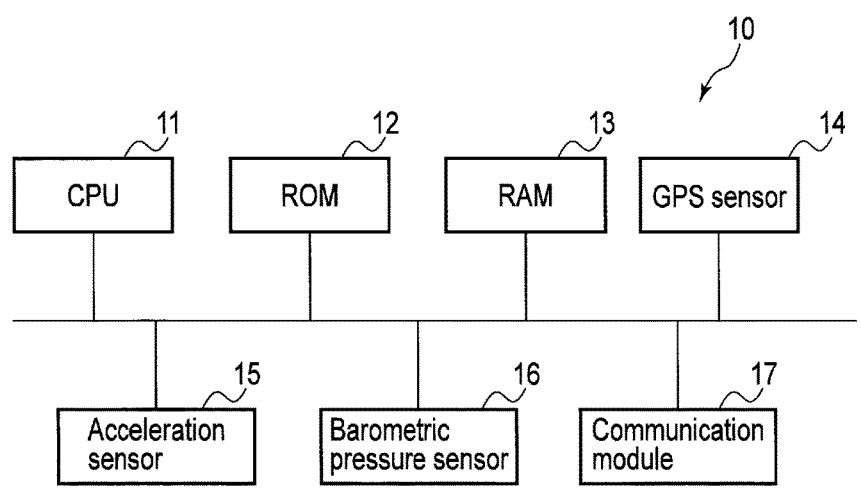
FIG. 5 is a diagram showing an example of a system configuration of the worker terminal.

FIG. 5 shows an example of a system configuration of the worker terminal 10. As shown in FIG. 5, the worker terminal 10 includes a CPU 11, a ROM 12, a RAM 13, a global positioning system (GPS) sensor 14, an acceleration sensor 15, a barometric pressure sensor 16, a communication module 17, etc. The components explained with reference to FIG. 2, FIG. 3, etc., are not shown in FIG. 5.

The CPU 11 is a hardware processor (processing circuit) which controls operations of the components in the worker terminal 10. The CPU 11 executes various types of software (programs for the worker terminal 10) loaded from the ROM 12 which is a nonvolatile memory on the RAM (main memory) 13.

The GPS sensor 14 is a sensor capable of detecting a position of (a worker wearing) the worker terminal 10 by executing communication with a GPS satellite.

The acceleration sensor 15 is a sensor capable of measuring the acceleration generated on (the worker wearing) the worker terminal 10.

The barometric pressure sensor 16 is a sensor capable of measuring a barometric pressure on the periphery of the worker terminal 10. The worker terminal 10 can estimate a position in a vertical direction of the worker wearing the worker terminal 10, based on (variation in) the barometric pressure measured by the barometric pressure sensor 16, and obtain information indicating the estimated position in a vertical direction of the worker.

The communication module 17 is a module which executes wireless communication with the management server 40, etc., via the network NTW. The communication module 17 executes wireless communication such as wireless LAN via, for example, an access point provided in the work area 100.

The communication module 17 can thereby transmit to the management server 40 information indicating the position detected by the GPS sensor 14 (hereinafter called position information of the worker), information indicating the acceleration measured by the acceleration sensor 15 (hereinafter called acceleration information of the worker), and the above-explained information obtained based on the barometric pressure measured by the barometric pressure sensor 16 (hereinafter called height information of the worker).

The communication module 17 may execute wireless communication conforming to standards such as Wi-Fi (registered trademark), WiMAX (registered trademark), 3G mobile communication, 4G mobile communication, and Bluetooth (registered trademark).

The worker terminal 10 further includes a microphone, etc., which are not shown in FIG. 5, and has a speech communication function implemented by a technology called Voice over Internet Protocol (VoIP), etc. The worker can execute speech communication with, for example, the manager via the worker terminal 10 by the speech communication function.

The worker terminal 10 may further include, for example, an LED lamp (not shown), etc., to notify the worker of various alerts.

Figure 6:
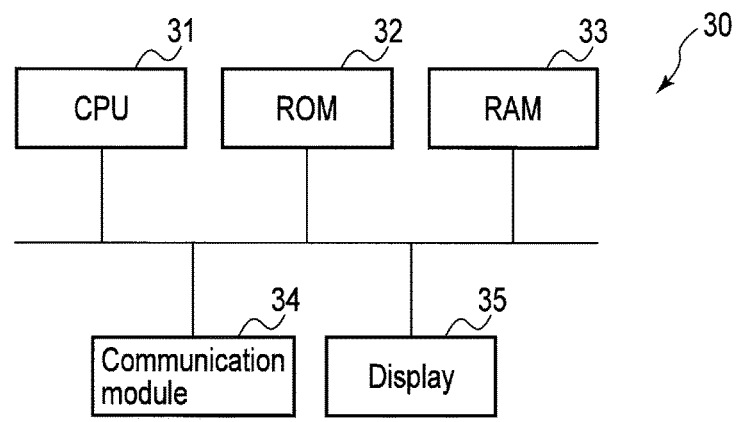
FIG. 6 is a diagram showing an example of a system configuration of the manager terminal.

FIG. 6 shows an example of a system configuration of the manager terminal 30. As shown in FIG. 6, the manager terminal 30 includes a CPU 31, a ROM 32, a RAM 33, a communication module 34, a display 35, etc.

The CPU 31 is a hardware processor (processing circuit) which controls operations of the components in the manager terminal 30. The CPU 31 executes various types of software (programs for the manager terminal 30) loaded from the ROM 32 which is a nonvolatile memory on the RAM (main memory) 33.

The communication module 34 is, for example, a module which executes wireless communication with the management server 40, etc.

The display 35 is a display device which displays various types of information. The display 35 implies, for example, a liquid crystal display (LCD).

In addition, the manager terminal 30 is assumed to include, for example, a speech communication function which enables the manager to execute speech communication with the worker, similarly to the worker terminal 10, but the function is not shown in FIG. 6.

If the manager terminal 30 is the eyeglasses-type wearable terminal or the like as explained above, the manager terminal 30 may further include various sensors such as a GPS sensor, an acceleration sensor and a barometric pressure sensor.

Figure 7:
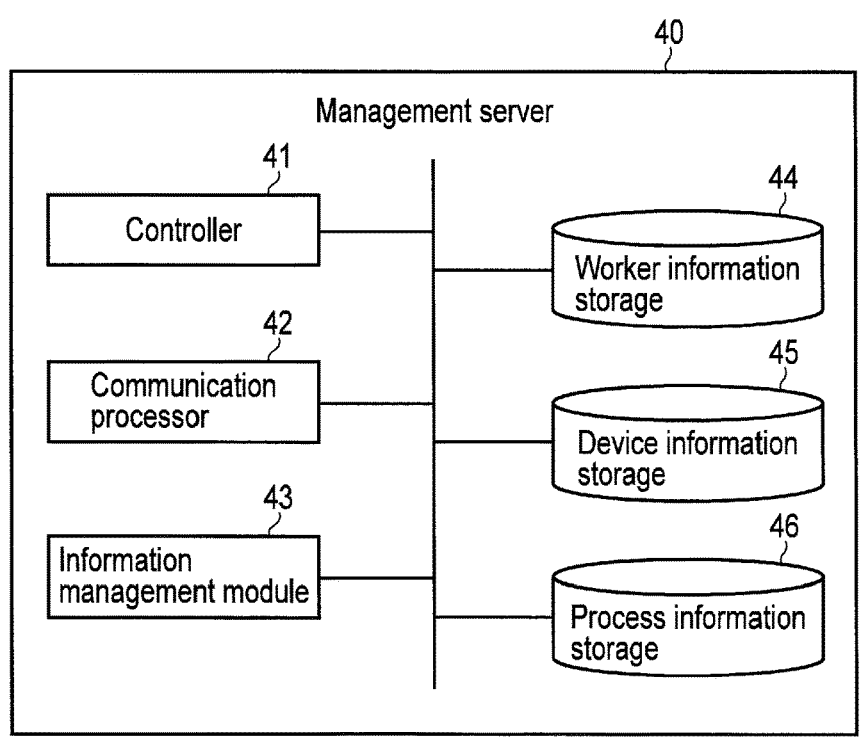
FIG. 7 is a block diagram showing an example of a functional configuration of a management server.

FIG. 7 is a block diagram showing a functional configuration of the management server 40. As shown in FIG. 7, the management server 40 includes a controller 41, a communication processor 42, an information management module 43, worker information storage 44, device information storage 45, and process information storage 46.

In the present embodiment, some or all the controller 41, the communication processor 42 and the information management module 43 are realized by causing a computer such as a CPU (hardware processor not shown) provided in the management server 40 to execute a program (program for the management server 40), i.e., by software. Some or all the modules 41 to 43 may be implemented by hardware such as an integrated circuit (IC), etc., or implemented as a combined configuration of software and hardware. The program executed by the computer may be installed in, for example, an arbitrary storage device (memory) provided in the management server 40.

The controller 41 controls the operation of the management server 40. The management server 40 can manage the worker wearing the worker terminal 10 and the product manufacturing process executed by the manufacturing device 20, etc., under control of the controller 41.

The communication processor 42 executes wireless communication with the worker terminal 10, etc. The communication processor 42 receives, for example, the above-explained position information, acceleration information, height information, etc., of the worker from the worker terminal 10.

The information management module 43 manages various types of information stored in the worker information storage 44, the device information storage 45, and the process information storage 46.

The worker information storage 44 stores information about the worker working within the work area 100 (hereinafter called worker information).

The device information storage 45 stores information about the manufacturing device 20 installed in the work area 100 (hereinafter called device information).

The process information storage 46 stores information about the product manufacturing process executed by the manufacturing device 20 (hereinafter called process information).

In the present embodiment, (the controller 41 provided in) the management server 40 estimates a status of the worker working within the work area 100, with the information received from the worker terminal 10, and the information stored in the worker information storage 44, the device information storage 45, and the process information storage 46. For example, the manager terminal 30, etc., are notified of the worker status estimated by the controller 41, via, for example, the communication processor 42.

The worker information stored in the worker information storage 44, the device information stored in the device information storage 45, and the process information stored in the process information storage 46 shown in FIG. 7 will be explained.

FIG. 8 shows an example of a data structure of the worker information stored in the worker information storage 44. As shown in FIG. 8, the worker information stored in the worker information storage 44 includes position information indicating a position of a worker and the status of the worker in association with a worker ID to identify the worker.

In the example shown in FIG. 8, the worker information storage 44 stores worker information elements 441 to 443.

The worker information element 441 includes position information "Xu1, Yu1" and status "working" in association with worker ID "HO_0001". The worker information element 441 indicates that the position of the worker identified by worker ID "HO_0001" is the position indicated by position information "Xu1, Yu1" and that the worker is executing the work (i.e., working). If the worker executes the work such as operating the manufacturing device 20, the status may include an identifier to identify the manufacturing device 20.

The position information "Xu1, Yu1" is assumed to indicate a position on a plane (XY plane) including an X-axis and a Y-axis where a predetermined position in the work area 100 is an origin and, for example, an axis in an East-West direction is the X-axis and an axis in a North-South direction is the Y-axis. The origin may be, for example, the position of the major manufacturing device 20 installed in the work area 100, a corner of the work area 100, or the like. The other position information may be set similarly.

The worker information element 442 includes position information "Xu2, Yu2" and status "moving" in association with worker ID "HO$_{13}$ 0002". The worker information element 442 indicates that the position of the worker identified by worker ID "HO_0002" is the position indicated by position information "Xu2, Yu2" and that the worker is executing the movement (i.e., moving).

The worker information element 443 includes position information "Xu3, Yu3" and status "waiting" in association with worker ID "HO_0003". The worker information element 443 indicates that the position of the worker identified by worker ID "HO_000" is the position indicated by position information "Xu3, Yu3" and that the worker is waiting.

The position information included in the worker information elements 441 to 443 can be periodically updated by receiving the above-explained worker position information from the worker terminal 10. The status included in the worker information elements 441 to 443 can be periodically updated, based on the worker position information and the above-explained status information of the manufacturing device 20. More specifically, for example, if the manufacturing device 20 in close vicinity to the worker position indicated by the position information is in the status of manufacturing the product, the status can be updated to "working (for example, executing the work of operating the manufacturing device 20)". The manufacturing device 20 in close vicinity to the worker position can be identified (searched) with the position information included in the device information to be explained later. If the worker position indicated by the periodically updated position information moves sequentially, the status can be updated to "moving". Furthermore, if the worker position indicated by the position information is a predetermined position (for example, a standby location), etc., the status can be updated to "waiting".

The status included in the worker information may be updated in accordance with, for example, the worker status specified by the worker at the worker terminal 10.

The worker information elements 441 to 443 alone have been explained with reference to FIG. 8, but the worker information storage 44 stores the worker information about all the workers working within the work area 100. The worker information about the worker has been explained but, for example, if the manager walks around in the work area 100, the position information indicating the manager position (manager information about the manager) may be managed in the management server 40.

FIG. 9 shows an example of a data structure of the device information stored in the device information storage 45. As shown in FIG. 9, the device information stored in the device information storage 45 includes position information indicating a position of the manufacturing device 20 and the risk information associated with use of the manufacturing device 20 (hereinafter called a device risk) in association with a device ID to identify the manufacturing device 20.

In the example shown in FIG. 9, the device information storage 45 stores device information elements 451 to 453.

The device information element 451 includes position information "Xd1, Yd1" and device risk "5" in association with device ID "M_0001". The device information element 451 indicates that the manufacturing device 20 identified by device ID "M_0001" is installed at a position indicated by position information "Xd1, Yd1" and that the device risk of the manufacturing device 20 is 5.

The device information element 452 includes position information "Xd2, Yd2" and device risk "4" in association with device ID "M_0002". The device information element 452 indicates that the manufacturing device 20 identified by device ID "M_0002" is installed at a position indicated by position information "Xd2, Yd2" and that the device risk of the manufacturing device 20 is 4.

The device information element 453 includes position information "Xd3, Yd3" and device risk "1" in association with device ID "M_0003". The device information element 453 indicates that the manufacturing device 20 identified by device ID "M_0003" is installed at a position indicated by position information "Xd3, Yd3" and that the device risk of the manufacturing device 20 is 1.

The device risk included in the device information is assumed to be represented by, for example, numbers 1 to 5. In this case, for example, device risk "1" represents the lowest risk (i.e., safest) and device risk "5" represents the highest risk (i.e., most dangerous). The device risk is assumed to be determined by considering not only the risk in the operation of the manufacturing device 20, etc., but also the installation position of the manufacturing device 20 (for example, installation at a high position).

The device information elements 451 to 453 alone have been explained with reference to FIG. 9, but the device information storage 45 stores the device information about all the manufacturing devices 20 installed in the work area 100.

FIG. 10 shows an example of a data structure of the process information stored in the process information storage 46. As shown in FIG. 10, the process information stored in the process information storage 46 includes a manufacturing start time, a work name and a status in association with the device ID to identify the manufacturing device 20.

The manufacturing start time indicates a start time of the process of manufacturing the product by the manufacturing device 20 identified by the device ID associated with the manufacturing start time (hereinafter called a manufacturing process of the manufacturing device 20). The work name indicates the work executed by the worker in the manufacturing process of the manufacturing device 20 identified by the device ID associated with the work name. The status indicates the current status of the manufacturing device 20 identified by the device ID associated with the status. The status is assumed to be periodically updated, based on the status information of the manufacturing device 20 received from each manufacturing device 20.

In the example shown in FIG. 10, the process information storage 46 stores process information elements 461 to 464.

The process information element 461 includes manufacturing start time "10:00", work name "work A" and status "manufacturing" in association with device ID "M_0001". The process information element 461 indicates that the start time of the manufacturing process of the manufacturing device 20 identified by device ID "M_0001" is 10:00, that the work executed by the worker in the manufacturing process is work A, and that the manufacturing device 20 is in a status of manufacturing the product.

The process information element 462 includes manufacturing start time "10:30", work name "work B" and status "preparation complete" in association with device ID "M_0002". The process information element 462 indicates that the start time of the manufacturing process of the manufacturing device 20 identified by device ID "M_0002" is 10:30, that the work executed by the worker in the manufacturing process is work B, and that preparation of the manufacturing device 20 for manufacturing the product is complete (i.e., start of the manufacturing is waited).

The process information element 463 includes manufacturing start time "11:30", work name "work C" and status "preparation incomplete" in association with device ID "M_0003". The process information element 463 indicates that the start time of the manufacturing process of the manufacturing device 20 identified by device ID "M_0003" is 11:30, that the work executed by the worker in the manufacturing process is work C, and that the preparation of the manufacturing device 20 for manufacturing the product is incomplete.

The process information element 464 includes manufacturing start time "12:30", work name "work D" and status "preparation incomplete" in association with device ID "M_0004". The process information element 464 indicates that the start time of the manufacturing process of the manufacturing device 20 identified by device ID "M_0004" is 12:30, that the work executed by the worker in the manufacturing process is work D, and that the preparation of the manufacturing device 20 for manufacturing the product is incomplete.

The process information elements 461 to 464 alone have been explained with reference to FIG. 10, but the process information storage 46 stores the process information about all the manufacturing devices 20 installed in the work area 100.

The operation of estimating the status of the worker working within the work area 100, by the management server 40 of the present embodiment will be hereinafter explained.

First, summary of the processing of estimating the worker status (hereinafter called status estimation processing) will be explained.

In the present embodiment, the worker status estimated by the status estimation processing is assumed to imply, for example, "dangerous" and "safe". "dangerous" indicates that the worker is in a dangerous status. "safe" indicates that the worker is in a safe status.

Figure 11:
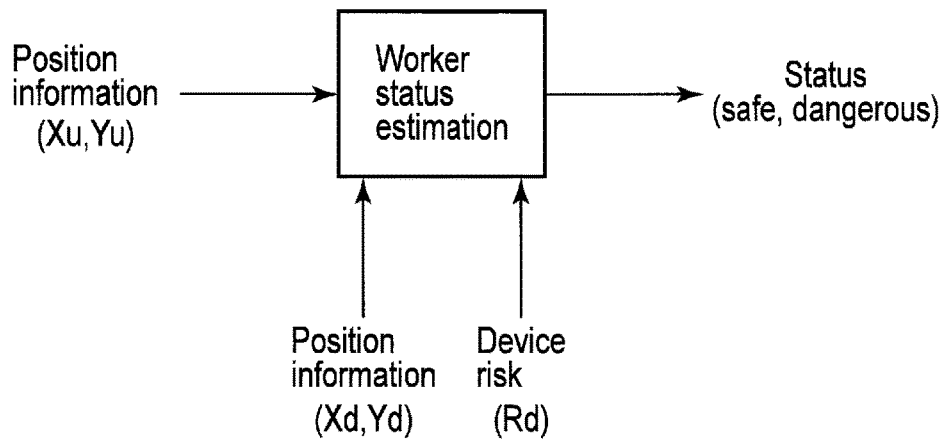
FIG. 11 is an illustration for explanation of summary of status estimation processing.

In the status estimation processing, as shown in FIG. 11, the worker status is estimated based at least in part on position information "Xu, Yu" of the worker, position information (Xd, Yd) of each manufacturing device 20 installed in the work area 100, and device risk (Rd).

More specifically, for example, if the manufacturing device 20 of high risk is installed in close vicinity to the worker, it is estimated that the worker status is "dangerous". In contrast, if the manufacturing device 20 is not installed in close vicinity to the worker or if the risk of the manufacturing device 20 which is installed in close vicinity to the worker is low, it is estimated that the worker status is "safe".

Figure 12:
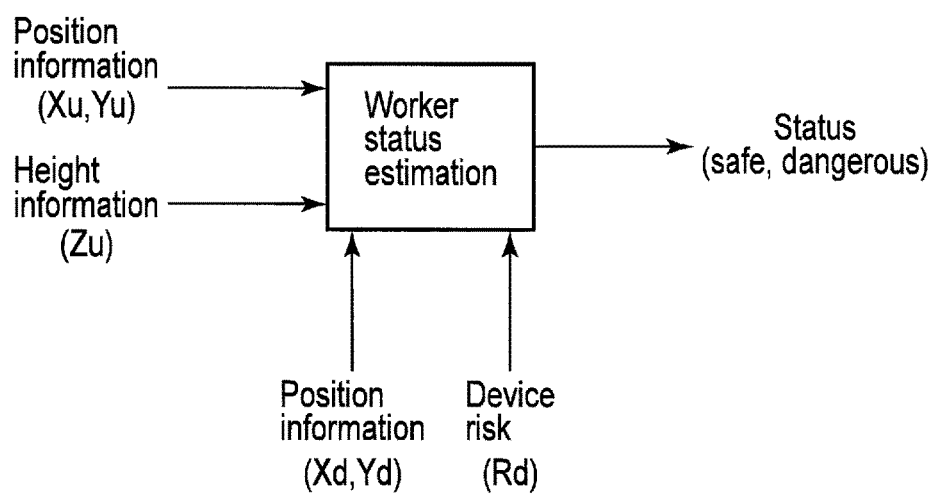
FIG. 12 is an illustration for explanation of summary of the status estimation processing.

Furthermore, height information (Zu) of the worker may be used as shown in FIG. 12, in the status estimation processing. Height information (Zu) of the worker indicates a position in the vertical direction of the worker, based on a floor surface (work floor) of the work area 100 as shown in, for example, FIG. 1. In this case, if the manufacturing device 20 of high risk is installed in close vicinity to the worker as explained above and if the worker is located at a high place, it is estimated that the worker status is "dangerous". If the manufacturing device 20 of high risk is installed in close vicinity to the worker as explained above, but if the worker is not located at a high place, it is estimated that the worker status is "safe".

Figure 13:
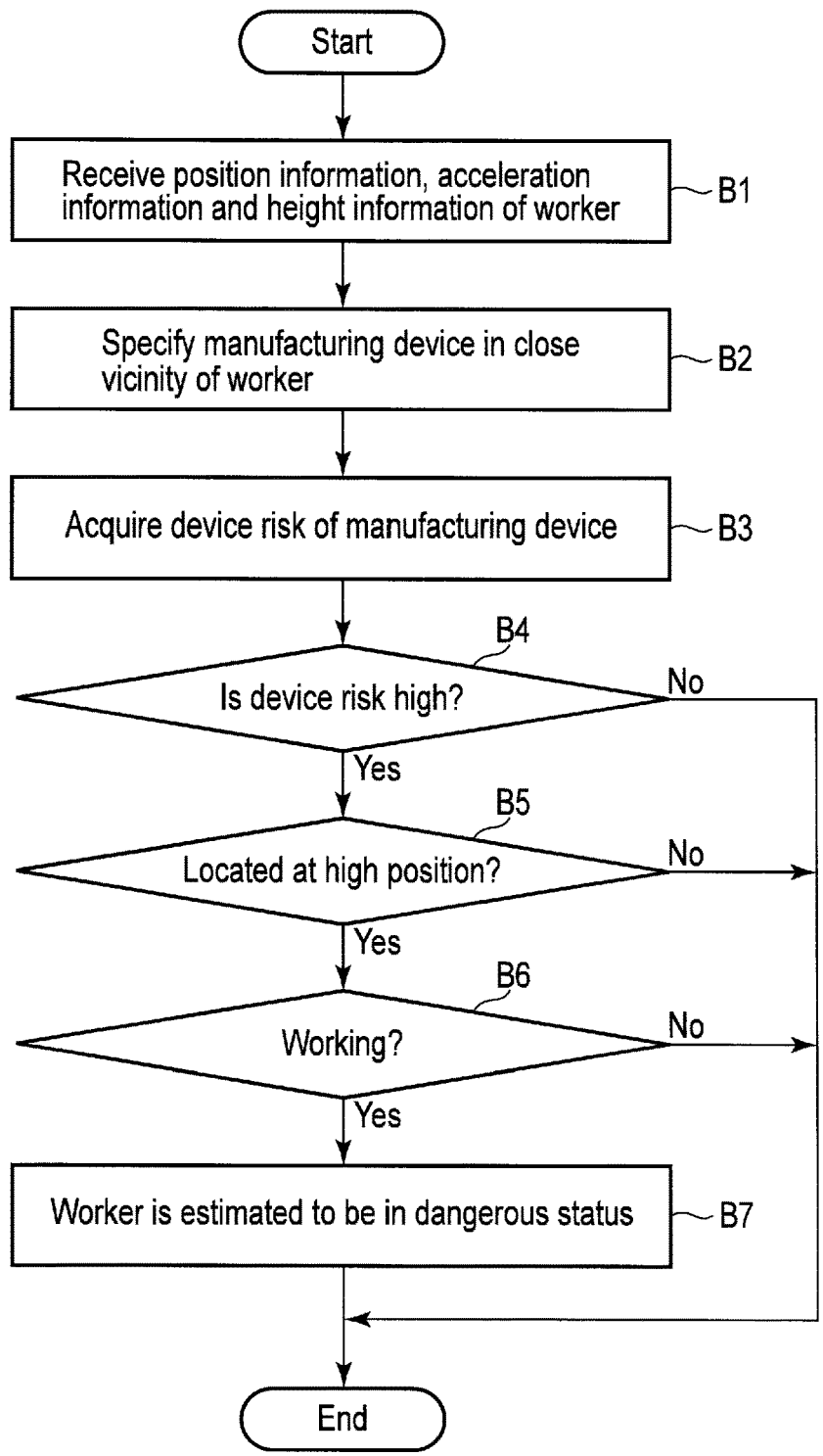
FIG. 13 is a flowchart showing a processing procedure of the status estimation processing.

The summary of the status estimation processing has been explained with reference to FIG. 11 and FIG. 12, and a procedure of the status estimation processing will be hereinafter explained in detail with reference to a flowchart of FIG. 13. In FIG. 13, the worker status is estimated based on the worker height information in addition to the worker position information, the position information of each manufacturing device 20 and the device risk. The processing shown in FIG. 13 is executed by the management server 40.

The processing shown in FIG. 13 is executed for each of worker terminals 10 worn by the respective workers working within the work area 100, and the worker terminal 10 which is a target of the processing is called a target worker terminal 10 for convenience in the following explanations. Similarly, the worker wearing the target worker terminal 10 is called a target worker for convenience.

First, the target worker terminal 10 worn by the target worker working within the work area 100 periodically transmits, for example, the position information, acceleration information and height information of the target worker, to the management server 40, together with the worker ID to identify the target worker, by continuously driving the GPS sensor 14, the acceleration sensor 15 and the barometric pressure sensor 16.

The communication processor 42 in the management server 40 thereby receives the position information, acceleration information, and height information of the target worker from the target worker terminal 10 (block B1).

Each manufacturing device 20 installed in the work area 100 periodically transmits the status information indicating the status of the manufacturing device 20 (i.e., status information of the manufacturing device 20) to the management server 40. The status information of the manufacturing device 20 thus transmitted periodically from the manufacturing device 20 is also received by the communication processor 42.

If the communication processor 42 receives various types of information, the information management module 43 updates (the position information and the status included in) the worker information and (the status included in) the process information, based on the position information of the target worker, the status information of the manufacturing device 20, etc.

If the processing of block B1 is executed, the controller 41 specifies the manufacturing device 20 installed in close vicinity to the target worker, based on each of the position information elements included in the device information stored in the device information storage 45 (block 32).

More specifically, the controller 41 determines whether a distance between the position indicated by the position information (first position information) included in each of the device information elements and the position indicated by the position information (second position information) of the target worker (i.e., a distance from the target worker) is smaller than or equal to a predetermined value (hereinafter called a first threshold value) or not, and specifies the manufacturing device 20 determined to have the distance smaller than or equal to the first threshold value as the manufacturing device 20 installed in close vicinity to the target worker. If no manufacturing device 20 is installed in close vicinity to the target worker (i.e., if the distance from the target worker is not smaller than or equal to the first threshold value in any manufacturing devices 20), the target worker is estimated to be in the safe status and the subsequent processing is not executed.

In the following explanations, the manufacturing device 20 specified in block 32 (i.e., the manufacturing device installed in close vicinity to the target worker) is called the target manufacturing device 20 for convenience.

The controller 41 acquires the device risk included in the device information about the target manufacturing device 20 stored in the device information storage 45 (i.e., the device risk of the target manufacturing device 20) (block B3). In this case, the controller 41 acquires the device risk included in the device information, in association with the device ID to identify the target manufacturing device 20.

Next, the controller 41 determines whether the device risk of the target manufacturing device 20 acquired in block B3 is high or not (block B4). In this case, the controller 41 determines whether the device risk of the target manufacturing device 20 is greater than or equal to a predetermined value (hereinafter called a second threshold value) or not. If the device risk of the target manufacturing device 20 is determined to be greater than or equal to the second threshold value, the device risk of the target manufacturing device 20 is determined to be high. If the device risk of the target manufacturing device 20 is not determined to be greater than or equal to the second threshold value, it is determined that the device risk of the target manufacturing device 20 is not high.

If the device risk of the target manufacturing device 20 is determined to be high (YES in block 34), it is determined whether the target worker is located at a high position or not, based on the height information of the target worker (block B5). In this case, the controller 41 determines whether the position (height) in the vertical direction of the target worker indicated by the height information of the target worker is higher than a threshold position (height) or not. If the position in the vertical direction of the target worker is determined to be higher than the threshold position, the target worker is determined to be located at a high position. In contrast, if the position in the vertical direction of the target worker is not determined to be higher than the threshold position, it is determined that the target worker is not located at a high position.

It can be estimated whether, for example, the target worker is executing the work (i.e., working) or not, based on (variation in) the acceleration indicated by the acceleration information of the target worker received in block B1.

For this reason, if the target worker is determined to be located at a high position (YES in block 55), the controller 41 determines whether the target worker is working or not, based on the acceleration indicated by the acceleration information of the target worker received in block B1 (block 56).

If the target worker is determined to be working (YES in block B6), the controller 41 estimates that the target worker is associated with a dangerous status. In other words, the controller 41 estimates that the target worker is in the dangerous status (i.e., the target worker is working in the dangerous status) (block B7). In this case, "dangerous" is held in the management server 40 as the target worker status.

If it is determined in block B4 that the device risk of the target manufacturing device 20 is not high (NO in block 24), it is estimated that the target worker is not in the dangerous status (i.e., the worker is in the safe status), and the processing is ended. In this case, "safe" is held in the management server 40 as the target worker status. "safe" is also stored in a case where it is determined that the target worker is not located at a high position in block B5 (NO in block B5) or it is determined that the target worker is not working in block 26 (NO in block B6).

Each status ("dangerous" or "safe") of the worker working within the work area 100 can be managed in the management server 40 by executing the processing shown in FIG. 13 for each worker terminal 10. The processing shown in FIG. 13 is periodically executed every time the management server 40 receives the position information, acceleration information, height information of each worker as explained above. The status of each worker is thereby updated in accordance with the variation in status.

In the processing shown in FIG. 13, the target worker is estimated to be in the dangerous status in a case where the device risk of the target manufacturing device 20 is high, the target worker is located at a high position, and the target worker is working, but one or two types of the processing in, for example, blocks B4 to 36 may be omitted. In other words, if the target worker is located at a high position and the target worker is working in a case where, for example, the processing in block 34 is omitted, the target worker may be estimated to be in the dangerous status. In addition, if the device risk of the target manufacturing device 20 is high and the target worker is working in a case where, for example, the processing in block B5 is omitted, the target worker may be estimated to be in the dangerous status. Furthermore, if the device risk of the target manufacturing device 20 (i.e., the manufacturing device in close vicinity to the target worker) is high in a case where, for example, the processing in blocks B5 and 36 is omitted, the target worker my be estimated to be in the dangerous status.

The processing in block 36 may be executed on the worker terminal 10 side. In this case, it may be determined by the worker terminal 10 whether the target worker is working or not, based on the acceleration indicated by the acceleration information of the target worker, and the determination result may be transmitted from the worker terminal 10 to the management server 40 instead of the acceleration information.

Furthermore, for example, if the worker terminal 10 is able to acquire the device information, etc., all the processing shown in FIG. 13 may be executed on the worker terminal 10 and the estimation result of the worker status may be output to the management server 40, etc.

It is determined whether the target worker is working or not, based on the acceleration indicated by the acceleration information of the target worker but, in some cases, the acceleration does not occur on the worker terminal 10 (eyeglasses-type wearable terminal) in accordance with the work (content) and it often cannot be detected that the target worker is working. For this reason, it may be determined in block B6 whether the target worker is working or not, based on, for example, the information (worker information and process information) stored in the worker information storage 44 or the process information storage 46. More specifically, for example, if the status included in the worker information in association with the worker ID to identify the target worker indicates that the target worker is working, it may be determined that the target worker is working. In addition, for example, if the status included in the process information in association with the device ID to identify the target manufacturing device 20 indicates that the manufacturing device is manufacturing (i.e., the target manufacturing device 20 is being operated), it may be determined that the target worker is working. It may be determined whether the target worker is working or not, based on the acceleration information, worker information and process information of the target worker.

In the present embodiment, for example, the worker terminal 10 worn by the worker estimated to be "dangerous" (i.e., the worker in the dangerous status) and the manager terminal 30 are assumed to receive an output of a notification corresponding to the status.

A processing procedure of the management server 40, of outputting the notification to the worker terminal 10 and the manager terminal 30 will be hereinafter explained with reference to a flowchart of FIG. 14.

First, the manager can execute, for example, instructions of work assignment, confirmation and change of work contents, etc., for each worker, by speech communication (telephone), by using (the speech communication function of) the worker terminal 10 and the manager terminal 30. In this case, the manager executes an operation for an outgoing call to (the worker terminal 10 worn by) the worker who is the target of instruction (hereinafter called an outgoing call operation), on the manager terminal 30. The outgoing call operation implies, for example, an operation of displaying a screen for making the outgoing call to the worker on the manager terminal 30, an operation of pressing a button to make the outgoing call to the worker on the screen, etc. The worker who the manager is to make the outgoing call by the outgoing call operation is hereinafter called a target worker in the explanations of FIG. 14.

If the outgoing call operation is executed on the manager terminal 30, the manager terminal 30 transmits an inquiry to the management server 40. The inquiry includes the worker ID to identify the target worker.

The communication processor 42 in the management server 40 receives the inquiry transmitted by the manager terminal 30 (block B11).

Next, the controller 41 determines whether the status of the target worker identified by the worker ID included in the inquiry received in block B11 is "dangerous" or not, based on each status of the worker managed by the management server 40 by executing the processing shown in FIG. 13 (block B12).

If the status of the target worker is determined to be "dangerous" (YES in block 312), the controller 41 outputs a notification including information that the status of the target worker is "dangerous" to the manager terminal 30, as a response to the inquiry received in block B11 (block B13).

In this case, the notification output by the controller 41 is displayed on the display 35 of the manager terminal 30. More specifically, for example, a message or the like indicating that the outgoing call to the target worker should not be made (or the target worker cannot respond to the incoming call) since the status of the target worker is "dangerous", is displayed on the display 35 of the manager terminal 30.

If such a message is displayed on the display 35 of the manager terminal 30, it is preferable that the manager cancel the outgoing call to the target worker and execute the outgoing call operation again after, for example, a predetermined time has elapsed.

As explained above, if the processing in block B13 is executed, the outgoing call made by the manager is canceled, and the controller 31 outputs to the worker terminal 10 a notification including information that the outgoing call has been canceled but the outgoing call operation has been executed by the manager (i.e., the outgoing call operation has been executed at the manager terminal 30) (block 314).

Figures 15, 16:
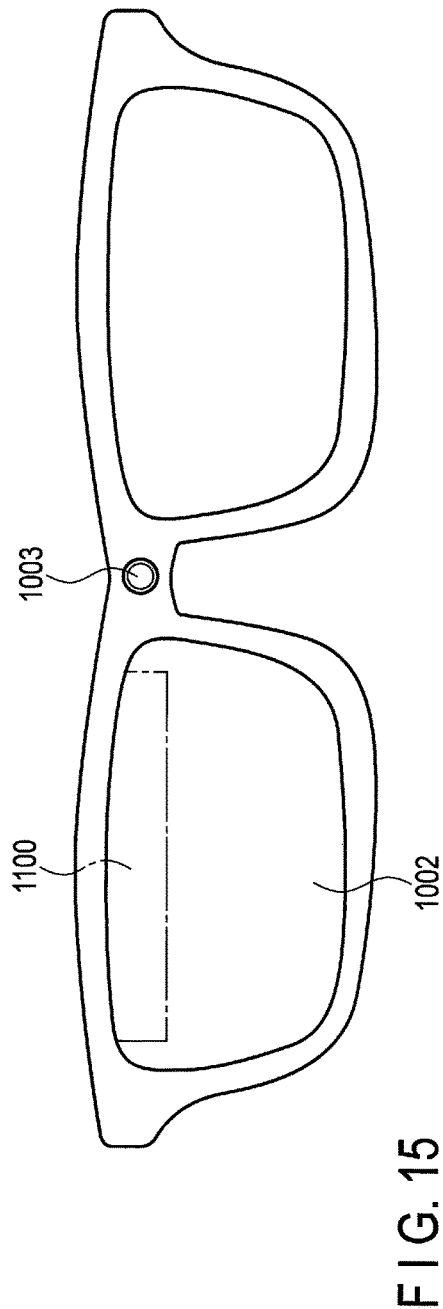
FIG. 15 is an illustration for explanation of an example of a display area of the worker terminal.
FIG. 16 is a table showing an example of a data structure of device information stored in device information storage of a second embodiment.

In this case, the notification output by the controller 41 is displayed on the display (lens-integrated screen 1002) of the worker terminal 10. More specifically, a message, a mark or the like indicating that the outgoing call operation has been executed by the manager (i.e., the manger has been willing to make the outgoing call to the target worker) is displayed on the display of the worker terminal 10. The message, the mark or the like is displayed in an area 1100, etc., of the lens-integrated screen 1002 as shown in FIG. 15 in order to secure the sight of the target worker wearing the worker terminal 10. The area 1100 shown in FIG. 15 is arranged at an upper portion of the lens-integrated screen 1002, but may be located at the other position (for example, a lower portion or the like) of the lens-integrated screen 1002 if the sight of the target worker can be secured.

The worker may be notified of the information that the outgoing call operation has been executed by the manager, by turning on the LED lamp mounted at the worker terminal 10, etc.

In the present embodiment, if an incoming call has come from the manager while the status of the target worker is "dangerous", cancellation of the outgoing call made by the manager is promoted, from the viewpoint that, for example, the target worker willing to respond to the incoming call may be involved in an unexpected accident. In contrast, even if the message or the like is displayed on the display of the worker terminal 10 while the status of the target worker is "dangerous", the target worker willing to confirm the message may be involved in an unexpected accident. For this reason, for example, such a message or the like may be displayed after the status of the target worker is updated from "dangerous" to "safe" (i.e., the dangerous status of the target worker has been eliminated).

In the present embodiment, if the status of the target worker is "dangerous", cancellation of the outgoing call made by the manager is promoted but, conversely, the manager may make the outgoing call to the target worker. In this case, in order to prevent risk (maintain security) on the target worker, the worker terminal 10 may be set not to output a ringing tone (incoming tone) (i.e., set not to ring)

when the outgoing call is made by the manager. In such a configuration, since the target worker often does not recognize the incoming call, an incoming call history at the worker terminal 10 may be displayed on the display of the worker terminal 10 when, for example, the status of the target worker is updated from "dangerous" to "safe".

Furthermore, if the status of the target worker is "dangerous", an incoming call may be forcefully rejected at the worker terminal 10 worn by the target worker under control of, for example, the management server 40.

In the processing shown in FIG. 14, the notification including the information that the outgoing call operation has been executed by the manager is output to the worker terminal 10 (i.e., the worker is notified that the outgoing call operation has been executed by the manager) but, for example, the worker may be notified that the worker is in a dangerous status. In this case, for example, the worker can be notified of information that the device risk of the manufacturing device 20 in close vicinity to the worker is high, or the like.

In addition, for example, if it is determined that the worker is moving, based on the worker position information periodically transmitted from the worker terminal 10 and if a dangerous street or site is located in close vicinity to the worker, the worker may be notified of presence of the dangerous street or site, etc. Furthermore, if a vehicle for work is traveling in the work area 100, the worker may be notified of information that the vehicle is approaching the worker, based on a position of the vehicle which is detected by a GPS sensor mounted in the vehicle. In this case, the worker may also be notified of the information together with a distance between the worker and the vehicle, etc.

Moreover, the worker may be notified of, for example, the status of the manufacturing device in close vicinity to the worker (for example, the manufacturing device is undergoing a trial run or out of action) in addition to the information that the worker is in the dangerous status.

In the present embodiment, as explained above, the position information (second position information) indicating the position of the worker (user) working within the work area 100 while wearing the worker terminal (eyeglasses-type wearable terminal) 10 is received from the worker terminal 10, and the worker status is estimated based on the position information (first position information) and the risk information included in the device information stored in the device information storage 45, and the received position information.

More specifically, for example, if the device risk of the manufacturing device 20 in close vicinity to (the worker wearing) the worker terminal 10 is greater than or equal to the predetermined value (second threshold value), it can be estimated that the worker in the dangerous status.

The position information received from the worker terminal 10 in this case is assumed to indicate the position detected by the GPS sensor 14 mounted in the worker terminal 10. The position of (the worker terminal 10 worn by) the worker may be estimated based on, for example, the position of the access point or the like which can establish communication with the worker terminal 10, of a plurality of access points provided in the work area 100.

In the present embodiment having such a configuration, since the manager does not need to confirm, for example, the status of each worker, burden on the manager can be reduced.

In addition, in the present embodiment, if it is further determined that the worker is located at a high position (i.e., the position in the vertical direction of the worker is higher than the threshold position), it can also be estimated that the worker is in the dangerous status. If it is further determined that the worker is working, it can also be estimated that the worker is in the dangerous status. In such a configuration, the worker status (i.e., the worker's dangerous status) can be estimated more exactly.

The position in the vertical direction of the worker is estimated based at least in part on (the variation in) the barometric pressure measured by the barometric pressure sensor 16 mounted in the worker terminal 10, but may be estimated based at least in part on, for example, an image showing the worker as taken by a camera provided in the work area 100 or an image showing the worker's periphery as taken by the camera 1003 mounted in the worker terminal 10. In addition, whether the worker is working or not may be determined based at least in part on the acceleration measured by the acceleration sensor 15 mounted in the worker terminal 10 or on the position information of the manufacturing device 20 included in the device information, the worker position information received from the worker terminal 10, the status information received from the manufacturing device 20, etc.

Furthermore, in the present embodiment, if the operation for outgoing call to the worker (i.e., the outgoing call operation) is executed for the manager terminal 30, the notification including the information that the worker is in the dangerous status is output to the manager terminal 30. In the present embodiment having such a configuration, since the manager can cancel the outgoing call to the worker in the dangerous status, the worker can concentrate on the (dangerous) work without attending to an incoming call or the like corresponding to the outgoing call from the manager. According to this, security of the worker can be secured, and the work efficiency of the worker, the manufacturing efficiency of the manufacturing device 20, etc., can be enhanced. The notification including the information that the worker is in the dangerous status may be output to the manager terminal 30 when, for example, the worker is estimated to be in the dangerous status.

In the present embodiment, (the worker terminal 10 worn by) the worker is notified of the information that the outgoing call operation has been made to the manager terminal 30 (i.e., the manager has been willing to make the outgoing call). In such a configuration, for example, since the worker can make an outgoing call to (i.e., call) the manager after ending a dangerous work, the manager can efficiently give an instruction to (i.e., establish communication with) the worker.

In the present embodiment, the worker can execute the work in a hands-free style by using the eyeglasses-type wearable terminal as the worker terminal 10. The worker terminal 10 of the present embodiment needs only to have an ability to supply (transmit) the position information, acceleration information and height information of the worker to the management server 40, and may be a wearable device in the other shapes such as a wristband. Furthermore, the worker terminal 10 may be a mobile device such as a smartphone held by the worker.

If the worker wearing the worker terminal (eyeglasses-type wearable terminal) 10 holds a mobile device such as a smartphone, for example, the worker terminal 10 and the smartphone can also be configured to link with each other. More specifically, the worker terminal 10 and the smartphone may be connected by, for example, Bluetooth (registered trademark) so as to establish communication with each other, and the position information indicating the position detected by the GPS sensor mounted in the smartphone may be received from the smartphone and used by the worker terminal 10.

An image taken by a camera mounted in the smartphone may be transmitted to the worker terminal 10 and displayed on the display of the worker terminal 10.

Furthermore, the worker status such as movement may be detected by a function incorporated in the smartphone to measure the number of steps of the worker, and the detected status may be transmitted to the management server 40.

If the worker terminal 10 does not include a speech communication function, speech communication between the worker and the manager may be established by using the speech communication function incorporated in the smartphone.

If the worker terminal 10 and the smartphone are thus linked with each other, various functions of the smartphone can be used.

Second Embodiment

Next, a second embodiment will be described. Since the environment in which a management system of the present embodiment is used, the network configuration of the management system, configurations of the worker terminal, manager terminal and management server, etc., are the same as those of the first embodiment, they are not hereinafter explained in detail. Arbitrarily, the present embodiment will be explained hereinafter with reference to FIG. 1 to FIG. 7. In the present embodiment, portions different from the first embodiment will be mainly explained.

The present embodiment is different from the first embodiment with respect to a data structure of device information stored in a device information storage 45 incorporated in a management server 40.

FIG. 16 shows an example of the data structure of the device information stored in the device information storage 45 of the present embodiment. As shown in FIG. 16, the device information stored in the device information storage 45 includes position information, device risk, work name and work risk in association with a device ID. The device ID, the position information and the device risk have been explained with reference to FIG. 9, and their detailed explanations are omitted.

The work name indicates a work executed by a worker in a manufacturing process of a manufacturing device 20 identified by the device ID associated with the work name. The work name included in the device information indicates a work obtained by further dividing the work represented by the work name included in the process information shown in FIG. 10. For this reason, a plurality of work names are associated with one device ID, in the device information shown in FIG. 16.

The work risk includes risk information (second risk information) associated with work executed in the particular range. In other words, the work risk indicates a risk about the work (content) represented by the work name associated with the work risk.

In the example shown in FIG. 16, the device information storage 45 stores device information elements 451a, 452a and 453a. Device information element 451a is information about the manufacturing device 20 identified by device ID "M_0001". Device information element 452a is information about the manufacturing device 20 identified by device ID "M_0002". Device information element 453a is information about the manufacturing device 20 identified by device ID "M_0003".

The device information element 451a includes work names "work A1", "work A2" and "work A3" in association with device ID "M_0001". The work indicated by each of work names "work A1" to "work A3" corresponds to each of the works obtained by dividing the work A executed by the worker in the manufacturing process of the manufacturing device 20 identified by device ID "M_0001" as explained with reference to FIG. 10. The device information element 451a includes work risks "1", "3" and "5" in association with work names "work A1", "work A2" and "work A3", respectively. According to the device information element 451a, the risk about the work indicated by work name "work A1" is 1, the risk about the work indicated by work name "work A2" is 3, and the risk about the work indicated by work name "work A3" is 5.

The device information element 452a includes work names "work B1" and "work B2" in association with device ID "M_0002". The work indicated by each of work names "work B1" and "work B2" corresponds to each of the works obtained by dividing the work B executed by the worker in the manufacturing process of the manufacturing device 20 identified by device ID "M_0002" as explained with reference to FIG. 10. The device information element 452a includes work risks "2" and "4" in association with work names "work B1" and "work B2", respectively. According to the device information element 452a, the risk about the work indicated by work name "work B1" is 2 and the risk about the work indicated by work name "work B2" is 4.

The device information element 453a includes work name "work C1" in association with device ID "M_0003". The work C executed by the worker in the manufacturing process of the manufacturing device 20 identified by device ID "M_0003" as explained with reference to FIG. 10 cannot be divided. For this reason, one work name alone is associated with device ID "M_0003" in the device information element 453a. In the case, work name "work C" included in the process information 463 shown in FIG. 10 and work name "work C1" included in the device information element 453a indicate the same work. The device information element 453a includes work risk "1" in association with work name "work C1". The device information element 453a indicates that the risk about the work represented by work name "work C1" is 1.

In the present embodiment, the worker status ("dangerous" or "safe") is estimated with the work risk.

Next, a procedure of the status estimation processing of the present embodiment will be explained with reference to a flowchart shown in FIG. 17.

First, processing of blocks B21 to B26 corresponding to the processing of blocks B1 to B6 shown in FIG. 13 is executed.

It is determined in block B26 whether the target worker is working or not, based on (the variation in) the acceleration indicated by the acceleration information of the target worker received in block B21 but, in some cases, specific vibration (acceleration) occurs on the target worker at a specific work and (a type of) the work (content) that the target worker is executing can be specified (estimated) based at least in part on the acceleration. The (pattern of) acceleration occurring at each work is preliminarily held in the management server 40.

For this reason, if it is determined in block B26 that the target worker is working (YES in block B26), the controller 41 acquires the work risk included in the device information (work risk of the target manufacturing device 20) in association with the work name indicating the work specified as explained above (block B27).

Next, the controller 41 determines whether the work risk of the target manufacturing device 20 acquired in block B27 is high or not (block B28). In this case, the controller 41 determines whether the work risk of the target manufacturing device 20 is greater than or equal to a threshold value (hereinafter called a third threshold value) or not. If the device risk of the target manufacturing device 20 is determined to be greater than or equal to the third threshold value, the work risk of the target manufacturing device 20 is determined to be high. If it is determined that the work risk of the target manufacturing device 20 is not greater than or equal to the third threshold value, it is determined that the work risk of the target manufacturing device 20 is not high.

If the work risk of the target manufacturing device 20 is determined to be high (YES in block B28), the processing of the block B29 corresponding to the processing of block B7 shown in FIG. 13 is executed.

If it is determined in block B28 that the work risk of the target manufacturing device 20 is not high (NO in block B28), it is estimated that the target worker is not in the dangerous status (i.e., the worker is in the safe status), and the processing is ended.

In the processing shown in FIG. 17, it is estimated that the target worker is in the dangerous status if the manufacturing device 20 of high risk is installed in close vicinity to the target worker and if the target worker is executing a dangerous work at a high position. It should be noted that at least one processing of blocks B24 to B26 and B28 may be omitted. If the processing of block B28 is omitted, the processing of block B27 is also omitted.

In the processing of block B27, the work (content) which the target worker is executing may be estimated based on, for example, the information (worker information or process information) stored in the worker information storage 44 or the process information storage 46. More specifically, if the status included in the worker information about the target worker is "working" and, for example, if the status included in the process information in association with the device ID to identify the target manufacturing device 20 is "manufacturing", it can be specified (estimated) that the work indicated by the work name included in the process information is the work which the target worker is executing.

In addition, if the status information received from the target manufacturing device 20 includes the operation (content) executed for the target manufacturing device 20, the work content of the target worker can be specified based on the operation, etc., in some cases. For this reason, each manufacturing device 20 may transmit the status information including the operation executed for the target manufacturing device 20 to the management server 40. Each manufacturing device 20 may also transmit to the management server 40 the status information including the name of the work estimated to be currently executed in accordance with the operation executed for the target manufacturing device 20 and the operation status of the manufacturing device 20, etc.

If the manager executes the outgoing call operation for the worker at the manager terminal 30 after the status of each worker is estimated by executing the processing shown in FIG. 17, the processing explained with reference to FIG. 14 is executed, but detailed explanations of this process are omitted in the present embodiment.

In the present embodiment, as explained above, the worker is estimated to be in the dangerous status if the risk about the work which the worker is executing is further determined to be greater than or equal to the predetermined value (third threshold value), as compared with the first embodiment.

For example, even if the worker is working in close vicinity to the manufacturing device 20 of high device risk (i.e., working for the manufacturing device 20), the risk about the current work may not be high according to progress of the manufacturing process of the manufacturing device 20.

In the present embodiment, possibility to urge the manager to cancel the outgoing call (i.e., to urge the manager not to call) though the risk about the work executed by the worker is not high (i.e., the worker is in a status of being able to response to the incoming call) can be avoided by utilizing the work risk as explained above. The manager can thereby give an instruction to (establish communication with) the worker more smoothly, as compared with the first embodiment.

Third Embodiment

Next, a third embodiment will be described. The present embodiment is different from the second embodiment with respect to a feature that a worker terminal 10 serving as an eyeglasses-type wearable terminal includes a line-of-sight detection sensor 18 as shown in FIG. 18.

The line-of-sight detection sensor 18 is, for example, a sensor using an eye potential sensing technology, and measures a potential difference (voltage variation) generated between a cornea side and a retina side of an eyeball, which is varied by the movement of the eyeball, with a plurality of electrodes attached to the worker terminal 10 (a periphery of the eye).

The worker terminal 10 can obtain the number of times of blink, the angle (direction) of the line of sight, etc., of the worker, based on the potential differential measured by the line-of-sight detection sensor 18, by using the line-of-sight detection sensor 18.

The information including the number of times of blink, the angle of the line of sight, etc., obtained by the worker terminal 10 (hereinafter called line-of-sight information) is transmitted to a management server 40 via a communication module 17 together with the other information (position information, acceleration information and height information).

In the present embodiment, a worker status ("dangerous" or "safe") is estimated with the line-of-sight information.

Next, a procedure of the status estimation processing of the present embodiment will be explained with reference to a flowchart shown in FIG. 19.

First, a communication processor 42 in the management server 40 receives the position information, acceleration information, height information and line-of-sight information of a target worker from the target worker terminal 10 (block B31). The line-of-sight information received by the communication processor 42 includes the number of times of blink and the angle of the line of sight, of the target worker, as explained above.

Next, processing of blocks B32 to B38 corresponding to the processing of blocks B22 to B28 shown in FIG. 17 is executed.

If the target worker is in a dangerous status (or feels dangerous), the target worker is often in a stressed status. In addition, a person in a stressed status generally tends to increase the number of times of blink. For this reason, in the present embodiment, the line-of-sight information received in block B31 is used to determine whether the target worker is in a stressed status or not.

If it is determined in block B38 that the work risk of the target manufacturing device 20 is high (YES in block B38), a controller 41 determines whether the target worker is in a stressed status or not, based on the line-of-sight information received in block B31 (block B39). In this case, the controller 41 determines whether the number of times of blink of the target worker included in the line-of-sight information is greater than or equal to a predetermined value (hereinafter called a fourth threshold value) or not. If the number of times of blink of the target worker is determined to be greater than or equal to the fourth threshold value, the target worker is determined to be in a stressed status. If it is determined that the number of times of blink of the target worker is not greater than or equal to the fourth threshold value, it is determined that the target worker is not in a stressed status.

The fourth threshold value is assumed to be, for example, a value determined based on the number of times of blink of the target worker at a normal time and to be preliminarily held in the management server 40.

The movement (variation in angle) of the line of sight is often characteristic in a person in a stressed status. For this reason, the processing may be executed by considering the angle of the line of sight included in the line-of-sight information received in block B31, in block B39.

If the target worker is determined to be in a stressed status (YES in block B39), the processing of block B40 corresponding to the processing of block B29 shown in FIG. 17 is executed.

If it is determined that the target worker is not in a stressed status (NO in block B39), it is estimated that the target worker is not in the dangerous status (i.e., the worker is in the safe status), and the processing is ended.

In the processing shown in FIG. 19, it is estimated that the target worker is in the dangerous status if the manufacturing device 20 of high risk is installed in close vicinity to the target worker, if the target worker is executing a dangerous work at a high position, and if the target worker is in a stressed status. It should be noted that at least one processing of blocks B34 to B36, B38 and B39 may be omitted.

If the manager executes the outgoing call operation for the worker at the manager terminal 30 after the status of each worker is estimated by executing the processing shown in FIG. 19, the processing explained with reference to FIG. 19 is executed, but detailed explanations of this process are omitted in the present embodiment.

In the present embodiment, as explained above, the worker is estimated to be in the dangerous status if the number of times of blink of the target worker is further determined to be greater than or equal to a predetermined value (fourth threshold value), as compared with the second embodiment.

In the present embodiment, in such a configuration, unnecessary cancellation of the outgoing call from the manager to the worker can be suppressed since, for example, the worker is estimated to be in the dangerous status only when the worker is in a stress status or cannot respond to an incoming call corresponding to the outgoing call made by the manager or (it is estimated that) the worker may be involved in an accident or the like by responding to an incoming call.

In the present embodiment, the line-of-sight detection sensor 18 is a sensor employing the eye potential sensing technology (i.e., the eye potential sensor), but any other sensors capable of obtaining the number of times of blink, the angle of the line of sight, etc., of the worker may be used as the line-of-sight detection sensor 18. More specifically, for example, a camera (such as an infrared camera or a visible light camera) capable of photographing an eyeball movement of the worker may be used as the line-of-sight detection sensor 18.

In addition, the line-of-sight information (the number of times of blink, the angle of the line of sight, etc.) obtained by using the line-of-sight detection sensor 18 may be used to operate the worker terminal 10. In other words, the worker terminal 10 may be able to be operated by the number of times of blink, the angle (direction) of the line of sight, etc., of the worker.

According to at least one of the above-explained embodiments, an electronic apparatus and a method capable of estimating the status of the worker (user) working within a particular range can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a first sensor configured to sense a position of a user wearing the electronic device and output position information indicative of the position of the user;
    a second sensor configured to sense a height of the user and output height information indicative of the height of the user from a floor surface;
    a third sensor configured to sense acceleration generated on the user and output acceleration information indicative of the acceleration; and
    an output device configured to output a notification corresponding to a state of the user based on the position information, the height information and the acceleration information, and the output device being configured to output the notification corresponding to a first state of the user if the height of the user is higher than a threshold position, if the position of the user is in close vicinity to a position of a device installed in a particular range, and if a work risk of a work that the user is executing is greater than a threshold value, the work being specified based on the acceleration information.

2. The electronic device of claim 1, wherein
    the output device is configured to output the notification if an operation for calling the electronic device is executed for a manager terminal used by a manager managing the user.

3. The electronic device of claim 2 further comprising a fourth sensor configured to (i) sense the number of times of blinking by or an angle of a line of sight of the user and (ii) output line-of-sight information indicative of the number of times of blinking by or the angle of the line of sight of the user.

4. The electronic device of claim 1, wherein the output device is configured to output the notification corresponding to the first state of the user representing a dangerous status of the user if the height of the user is higher than the threshold position.

5. The electronic device of claim 1, wherein the output device is configured to output the notification corresponding to the first state of the user representing a dangerous status of the user if the height of the user is higher than the threshold position and if the position of the user is in close vicinity to the position of the device installed in the particular range.

6. The electronic device of claim 1, wherein the second sensor comprises a barometric pressure sensor measuring a barometric pressure, and
the height of the user is based on a barometric pressure measured by a barometric pressure sensor.

7. The electronic device of claim 1, wherein the first sensor comprises a GPS sensor.

8. The electronic device of claim 1, further comprising:
a transmitter configured to transmit the position information and the height information to a server, and
a receiver configured to receive state information from the server, the state information indicative of the state of the user.

9. The electronic device of claim 1, further comprising:
a processor configured to determine the state of the user based on the position information and the height information.

10. The electronic device of claim 1, wherein the output device comprises a display or a LED.

11. A management system comprising:
a first device including
a first sensor configured to sense a position of a user wearing the first device and output position information indicative of the position of the user;
a second sensor configured to sense a height of the user and output height information indicative of the height of the user from a floor surface;
a third sensor configured to sense acceleration generated on the user and output acceleration information indicative of the acceleration; and
a transmitter configured to transmit the position information, the height information and the acceleration information; and
a second device is configured to (i) receive the position information, the height information and the acceleration information, (ii) determine a state of the user based on the position information, the height information and the acceleration information, and (iii) transmit state information indicative of the state of the user to the first device, wherein
the first device is configured to output a notification corresponding to the state of the user, the notification is output if the height of the user is higher than a threshold position, if the position of the user is in close vicinity to a position of a device installed in a particular range, and if a work risk of a work that the user is executing is greater than a threshold value, the work being specified based on the acceleration information.

12. A management system comprising a first device, a second device, a third device and a fourth device, wherein
the first device is configured to detect a position of a user wearing the first device and transmit position information indicative of the position of the user to the third device,
the second device is configured to detect a height of the user and transmit height information indicative of the height of the user from a floor surface to the third device,
the third device is configured to detect acceleration generated on the user and transmit acceleration information indicative of the acceleration,
the fourth device is configured to receive the position information from the first device, the height information from the second device and the acceleration information from the third device, and determine a state of the user based on the position information, the height information and the acceleration information,
the first device is configured to output a notification corresponding to the state of the user, and
the notification is output if the height of the user is higher than a threshold position, if the position of the user is in close vicinity to a position of a device installed in a particular range, and if a work risk of a work that the user is executing is greater than a threshold value, the work being specified based on the acceleration information.

13. The electronic device of claim 1, wherein a time to output the notification is based on the state of the user.

14. The electronic device of claim 1, wherein the output device is configured to output the notification if it is determined that the first state of the user represents the user is in a stressed status based on a line-of-sight information.

15. The electronic device of claim 1, wherein the height of the user corresponds to a measured height of the user in a vertical direction from the floor surface and is output as the height information.

16. The management system of claim 11, wherein a time to output the notification is based on the state of the user.

17. The management system of claim 12, wherein a time to output the notification is based on the state of the user.

* * * * *